Figure 6C:
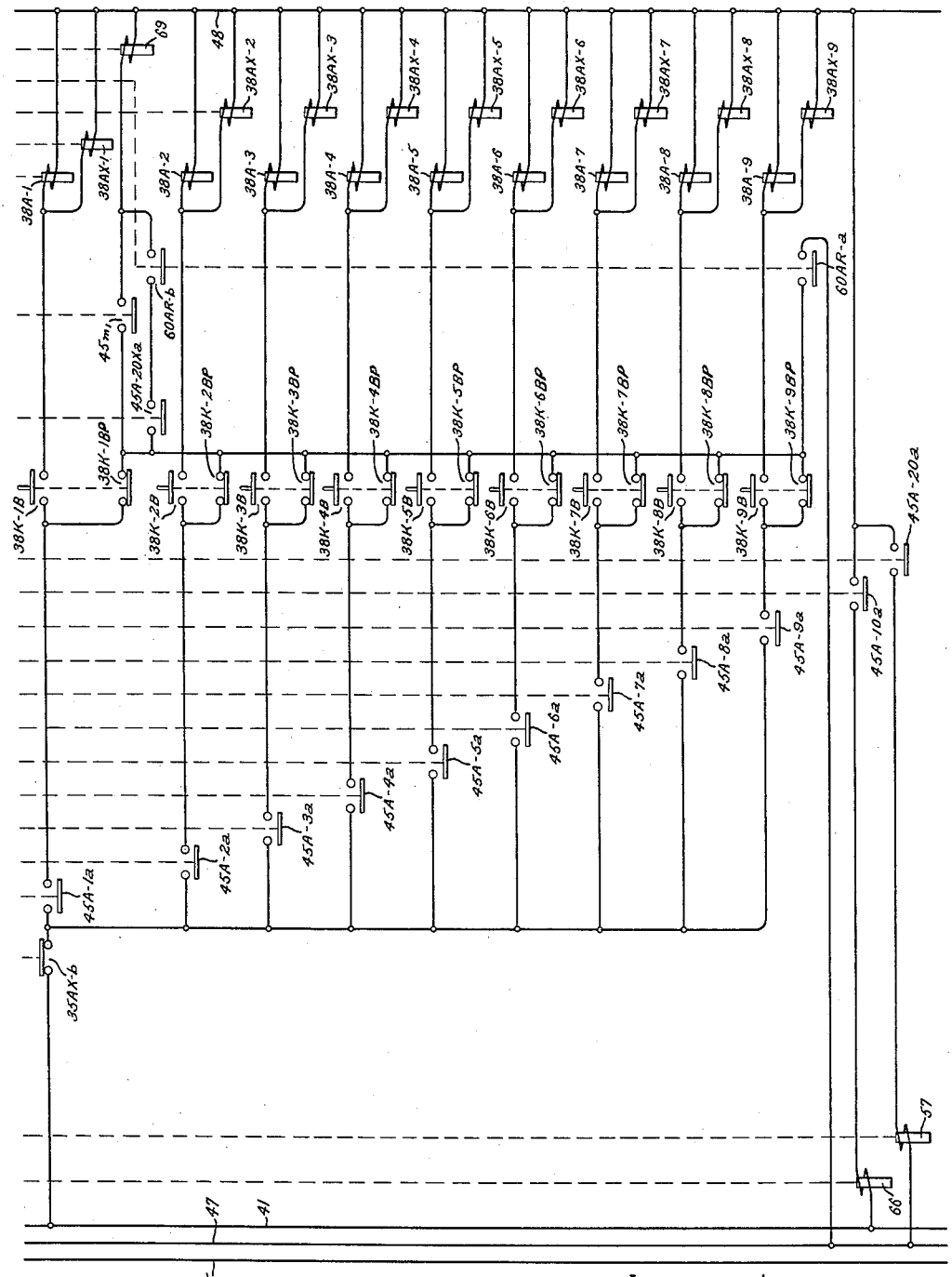

May 2, 1961 J. C. McMAHON 2,982,368
AUTOMATIC BATCH-WEIGHING CONTROL SYSTEM
Filed June 26, 1957 6 Sheets-Sheet 1
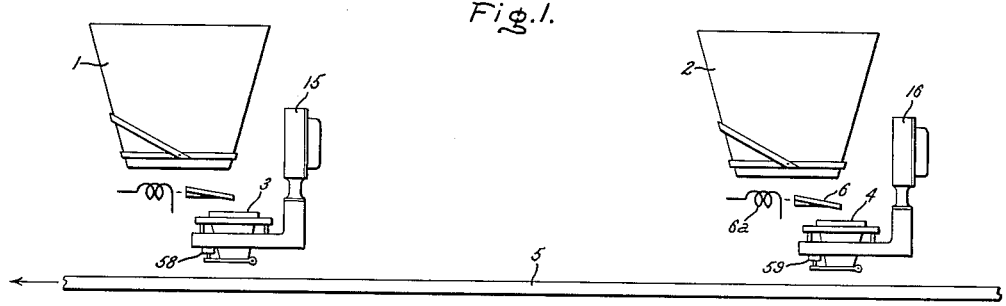
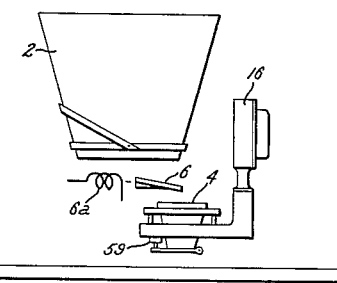
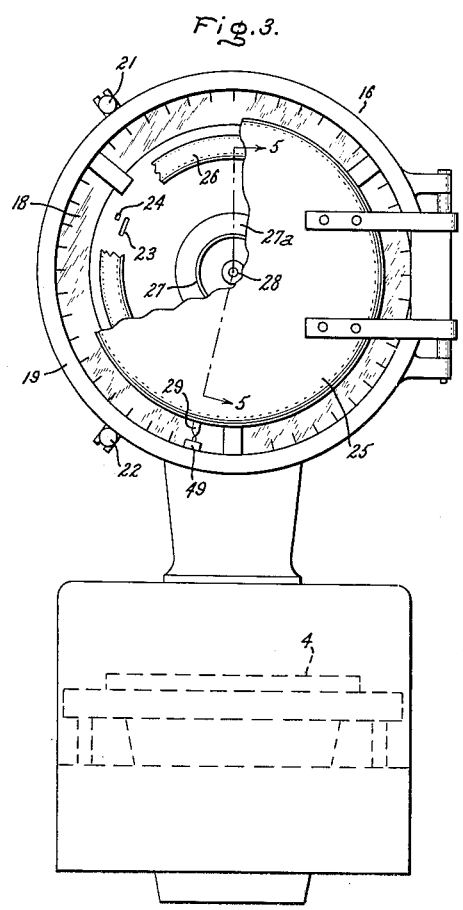
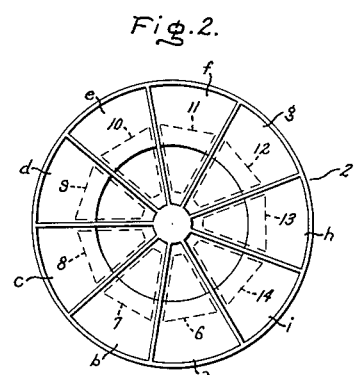
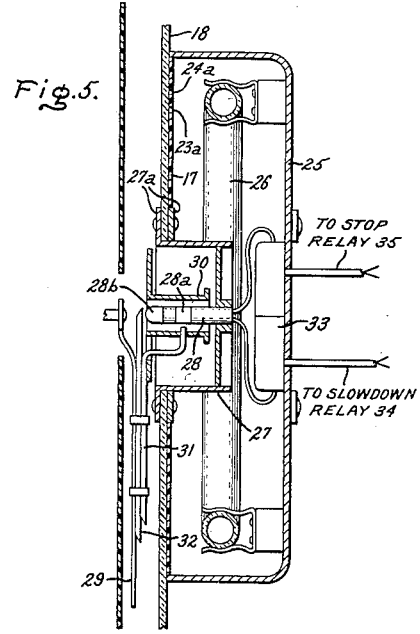
Inventor:
Jerome C. McMahon,
by Irving H. Marshman
His Attorney.

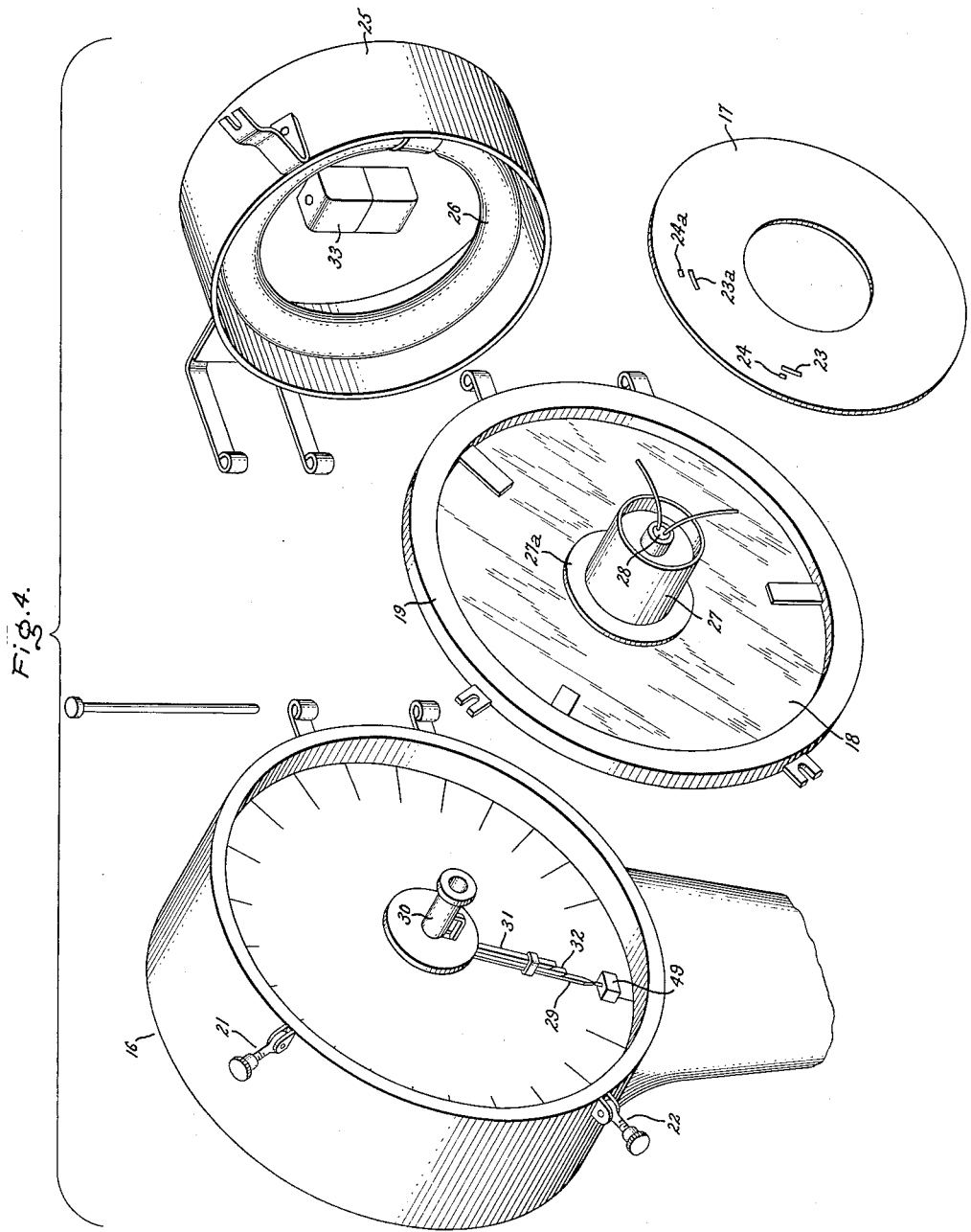

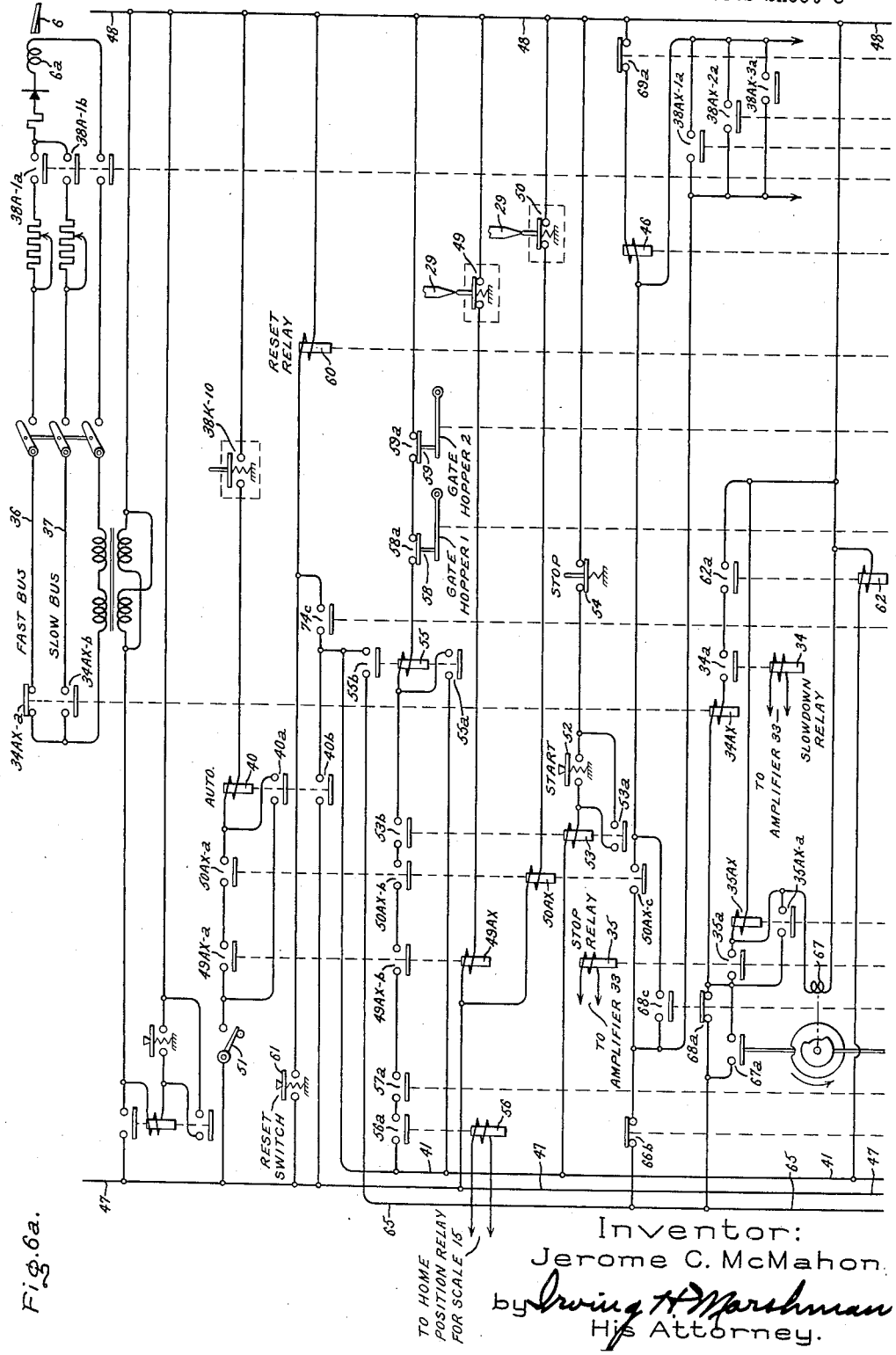

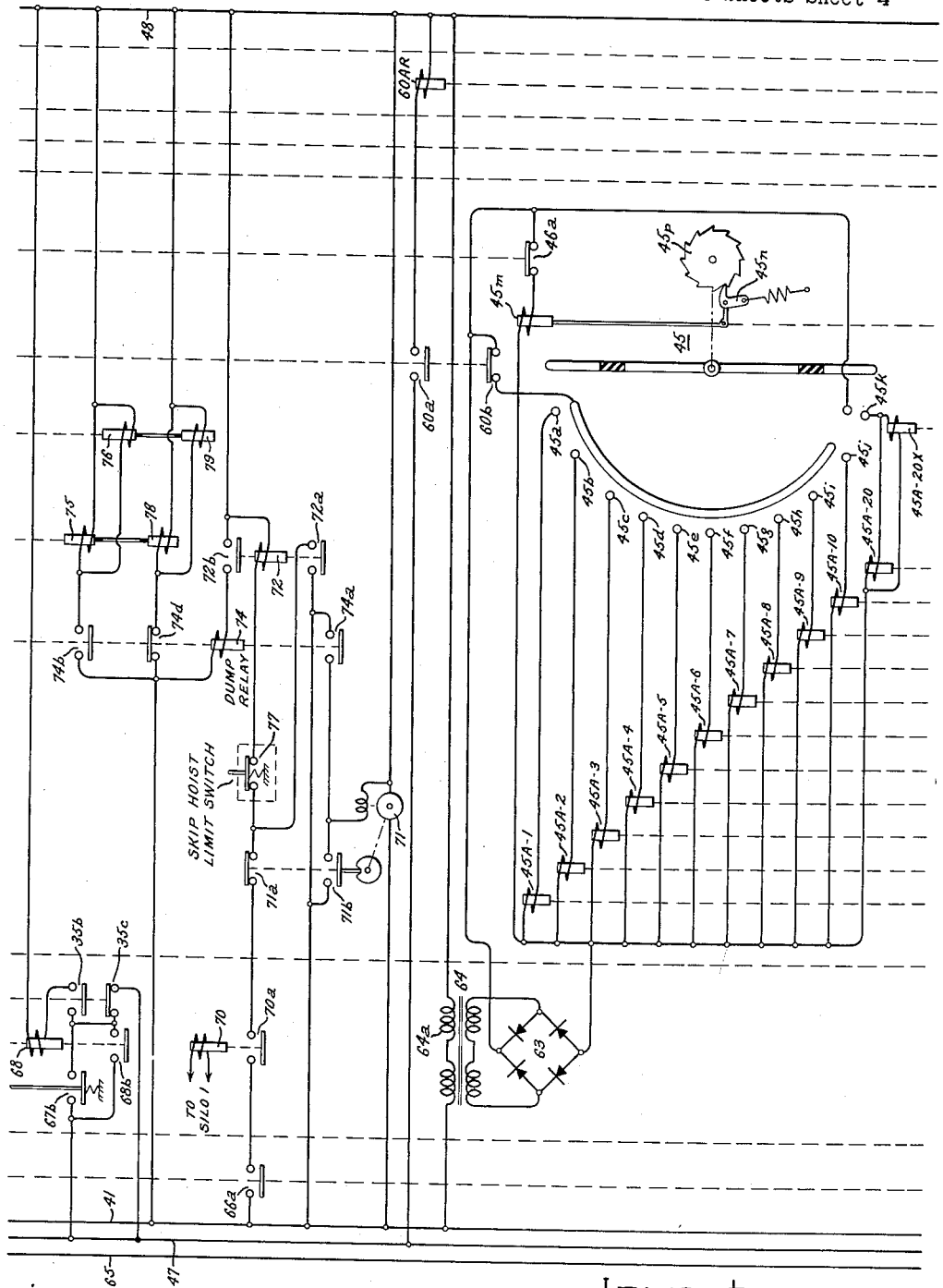

May 2, 1961 J. C. McMAHON 2,982,368
AUTOMATIC BATCH-WEIGHING CONTROL SYSTEM
Filed June 26, 1957 6 Sheets-Sheet 5

Inventor:
Jerome C. McMahon,
by Irving H. Marshman
His Attorney.

May 2, 1961          J. C. McMAHON          2,982,368
AUTOMATIC BATCH-WEIGHING CONTROL SYSTEM
Filed June 26, 1957          6 Sheets-Sheet 6
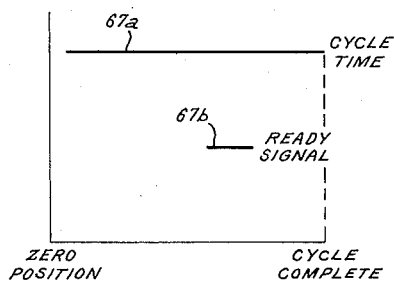
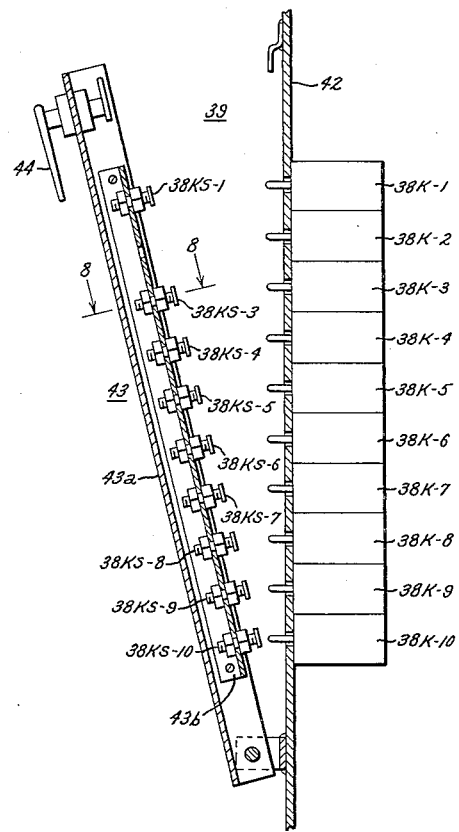
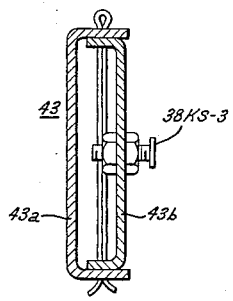
Inventor:
Jerome C. McMahon,
by Irving H. Marshman
His Attorney.

United States Patent Office 2,982,368
Patented May 2, 1961

2,982,368

AUTOMATIC BATCH-WEIGHING CONTROL SYSTEM

Jerome C. McMahon, Salem, Va., assignor to General Electric Company, a corporation of New York Filed June 26, 1957, Ser. No. 668,249

6 Claims. (Cl. 177—70)

This invention relates to control systems and more particularly to automatic weighing control systems, and it has for an object the provision of a simple, reliable and improved control system of this character.

More specifically, the invention relates to batch-weighing control systems, and a further object is the provision of a control system for automatically controlling a plurality of feeders to supply predetermined exact weights of different materials from individual storage bins to form a batch.

There are a number of batch-weighing applications in which the weighing program must frequently be changed with respect either to the ingredients constituting the batch or their amounts or both. In such cases it is desirable that the changeover to another preformulated batch take as little time as possible, and accordingly a further object of the invention is the provision of an automatic batch program control in which the time required for program change is reduced to a minimum.

Another important object of the invention is the provision of a batch-weighing control system which eliminates inaccuracies resulting from manual adjustments of the weight-sensing limit switch mechanism and also eliminates chance errors resulting from manual selection of the bin containers which are to furnish ingredients to a desired batch.

In carrying the invention into effect in one form thereof, a weighing scale to which a plurality of different materials are to be fed in succession from a plurality of material supplies to form a batch is provided with suitable weight-sensing means for automatically and successively controlling the material feeders to supply to the scale the exact required amount of the ingredient material which each supplies to the batch. Specifically, the weight sensing means stops each feeder in response to its having delivered to the scale the exact required weight of material, starts the next successive feeder and continues the cycle of stopping one feeder and starting the next until there has been delivered the exact weight of each of the materials required to be supplied from each of such feeders.

With respect to the rapid program changing aspect of the invention, a selector switching mechanism is provided which comprises a panel mounting a plurality of individual switching devices, one for each of the stored ingredients, together with a plurality of key selectors, a different one for each of the preformulated batches to be programmed and each containing an array of actuators for only those individual switches which control feeders for the ingredients going into the particular batch. Also provided are a plurality of scale program cards, a different one for each of the different batches and each paired with a different key selector and containing accurately positioned weight indication sensing means for each of the ingredients selected by the key selector with which it is paired.

For a better and more complete understanding of the invention, reference should now be made to the following specification and to the accompanying drawings of which Fig. 1 is a simple, diagrammatical sketch of material storage bins, feeders, scales and conveyors to the control of which the invention may appropriately be applied; Fig. 2 is a diagrammatic plan view of a silo containing a plurality of material storage bins; Fig. 3 is a view in front elevation of an industrial type weighing scale; Fig. 4 is an exploded view in perspective of certain elements of the scale together with elements of the weight indication sensing means and feeder slowdown and stop signal generating means; Fig. 5 is a sectional view of the indicating portion of the scale taken on the line 5—5 of Fig. 3; Figs. 6a, 6b and 6c are portions of a schematic diagram which when placed side by side in the order named from top to bottom constitute a complete elementary diagram of the control system of the invention; Fig. 7 is a view in side elevation of the bin key selector detail; Fig. 8 is a sectional view taken on the line 8—8 of Fig. 7; Fig. 9 is a timing diagram of a timing switch which is used in an embodiment of the invention. Referring now to the drawings, a plurality of different ingredient materials of which batches are to be formed containing exact predetermined weights of each are stored in a plurality of suitable containers such as silos 1 and 2. Although only two silos are shown in Fig. 1, the principle of the invention is equally applicable to any number of silos. These silos may be and preferably are divided into a number of separate bins. For example, as illustrated in Fig. 2, silo 2 is divided into nine separate bins designated a–i inclusive. It could, of course, have a larger or smaller number of bins.

Beneath the silos 1 and 2 are disposed weigh hoppers 3 and 4 respectively to which are supplied appropriate amounts of the materials from the different storage bins to form preformulated batches. Disposed in material-receiving relationship beneath the weigh hoppers 3 and 4 is a batch belt conveyor 5 which is driven by suitable driving means not shown. Between each bin of silo 2 and the associated weigh hopper 4 is a corresponding one of a plurality of material feeders 6–14 inclusive. These feeders may be of any appropriate type. For example they may be of the solenoid-actuated vibratory screen type.

*Scales and weight indication sensors*

Operatively associated with the weigh hoppers 3 and 4 are weighing scales 15 and 16 respectively. These may be any conventional industrial commercial type of scale. For the purpose of converting accurate scale indications into information signals to be used by the control, the scales are provided with suitable programmed plural position weight-sensing means. Since the weight sensors for both scales are generally similar, only that for scale 16 is described in detail. It comprises an opaque program card 17 which is mounted concentric with the axis of rotation of the scale pointer on the outside surface of the glass 18 of the hinged scale door 19. Hinged bolt and lug clamps 21 and 22 lock the door in the closed position.

In the program card 17 are accurately cut a plurality of pairs of rectangular shaped holes 23, 23a; 24, 24a; etc. according to a predetermined pattern which determines the weight of each individual ingredient of the specific batch for which the particular card is designed. One hole in each pair is utilized to generate a "slow down" signal and the other is utilized to generate a "stop" signal. In order to achieve maximum accuracy in the system the stop signal hole is placed at the greater radius from the center. Thus the holes 23, 23a in the inter circle are slowdown signal holes and the holes 24, 24a in the outer circle are stop signal holes.

In front of the program card and within an enclosing casing 25 which is hinged to the scale housing is mounted a light source which is illustrated as a ring fluorescent lamp 26. Secured in a centrally disposed opening in the door glass 18 by means of interior and exterior flanges 27a, which are bolted thereto, is an opaque cylindrical housing 27 for a photoelectric tube 28. This tube comprises a single envelope within which two separate photoelectric cells are arranged in end to end relationship.

To the axis end of the scale pointer 29 is secured the closed end of a tubular opaque housing member 30. Its other end which is open projects into the open end of the housing member 27 on the scale glass to surround the photoelectric tube 28 as shown in Fig. 5. Thus the housing 27 and 30 are telescoped to constitute a light-tight enclosure for shielding the photoelectric tube from extraneous light.

On the scale pointer 29 are mounted two light-conducting rods 31 and 32. These rods may be of any suitable light-conducting material such as the methyl methacrylate marketed under the trademark Lucite. This material has the useful property of being able to conduct or "pipe" light around bends. The ends of the rods remote from the center are formed so that light impinging upon them in a direction normal to the plane of rotation of the scale pointer is propagated along their lengths toward the pointer's axis of rotation. As best illustrated in Fig. 4, rod 32 extends radially outwardly a sufficient distance to enable it to receive light transmitted through the stop signal holes, i.e. the holes 24, 24a, etc. in the outer circle of the program card. The shorter rod 31 can receive only light passing through the slow down signal holes 23, 23a, etc. in the inner circle. The longer rod 32 is behind the shorter rod and consequently does not receive any light passing through the slow down signal holes. The other ends of the rods enter the tubular housing 30 and are bent so that each directs light on a different one of the photoelectric cells within phototube 28.

Mounted within the enclosing casing 25 on the end wall thereof is an amplifier 33 which is divided into two sections. One section is connected to amplify the output of the photoelectric cell which receives light passing through the slowdown signal holes and its output is connected to supply the operating coil of a relay 34 known as the slowdown relay. The other section amplifies the output of the photoelectric cell which receives light passing through the stop signal holes and supplies the operating coil of a relay 35 known as the stop relay. The slowdown and stop relays are mounted on a suitable control panel remote from the scale. In its deenergized and dropped out position, the slowdown relay 34 opens its normally open contacts 34a to deenergize and drop out an auxiliary relay 34AX whose normally closed contacts 34AX-a energize a bus 36 known as the "fast" bus from a source of supply. When the slowdown relay is picked up, it energizes the auxiliary relay to pick up and close its normally open contacts 34AX-b to energize the bus 37 known as the "slow" bus and simultaneously to open its normally closed contacts 34AX-a to deenergize the fast bus. Thus, only one of these buses may be energized at any one time. In order that each of the feeders 6–14 inclusive may be operated at full speed, slow speed and stopped, each is provided with a contactor for controlling its operation. For example, a contactor 38A–1 is operatively associated with feeder 6. When it is energized it simultaneously connects the feeder 6 solenoid 6a both to the fast bus and to the slow bus (only one of which is energized at a time). Similar contactors 38A–2 to 38A–9 inclusive are provided for the feeders 7 to 14 inclusive respectively. Operatively associated with contactors 38A–1 to 38A–9 are an equal number of corresponding auxiliary relays 38AX–1 to 38AX–9 respectively.

*Bin selector panel*

For the purpose of selecting the ingredient materials which are to constitute a particular batch, suitable selector switching means are provided which comprise a bin selector panel 39 in which are mounted key selector switches 38K–1 to 38K–9 having normally open interlock contacts 38K–1B to 38K–9B respectively connected in the energizing circuits for the operating coils of the feeder control contactors 38A–1 to 38A–9 inclusive and of the auxiliary relays 38AX–1 to 38AX–9 inclusive respectively as shown in Fig. 6c. The switches 38K–1 to 38K–9 are also provided with normally closed contacts 38K–1BP to 38K–9BP respectively. One additional switch 38K–10 has a single normally open contact in the energizing circuit for the operating coil of the "automatic" contactor 40 for the purpose of effecting operation of its contacts to energize the automatic supply bus 41.

A preferred construction of this bin selector switching panel 39 is illustrated in Figs. 7 and 8 in which the selector switches 38K–1 to 38K–10 are illustrated as a row of conventional contact blocks mounted upon the back surface of a steel base member 42 with their operating pins projecting through holes in the base member. On the front of the base member is mounted a channel assembly 43 hinged at the bottom and comprising an outer channel member or housing 43a and an inner removable key channel member 43b which has provision for mounting a plurality of switch actuators in the form of standard adjustable machine screws 38KS–1 to 38KS–9, one for each of the contact blocks corresponding to the feeders which are to be actuated to supply materials for a particular batch. An additional actuator 38KS–10 is provided for actuating switch 38K–10. The inner removable key channel member is accurately tapped for the screw actuators which are to be mounted thereon so that when it is accurately positioned on the outer member by guide pins each of the screw actuators is correctly positioned to actuate the operating pin of the contact block for the feeder which it is intended to control. Thus there will be a different removable inner key channel member for each different batch to be formed and each having an array of screw actuators for actuating only those contact blocks which control the feeders for the ingredient materials going into the specific batch for which it is designed.

When the hinged assembly 43 is swung into place and latched by the latching handle 44, the screws in the array operate the corresponding contact blocks to close their normally open contacts 38K–1B to 38K–9B in the energizing circuits of the contactors 38A–1 to 38A–9 inclusive for the feeders which are to furnish the ingredients to the batch in the process of formation. When the program of ingredients for a new and different batch is to be changed it is necessary only to remove the inner key channel member with its array of operating screws and to replace it with a different key channel with the appropriate array of operating screws for the new batch. For each key channel member with a different array of operating screws there is a corresponding scale program card 17 with slowdown and stop signal holes accurately cut to effect accurately weighing out the desired, exact weight of each of the selected ingredients of the batch, i.e. each of the ingredients for which there is an operating screw in the key selector channel to select its feeder for operation. This arrangement provides complete selectivity of any one or any combination of the bins from which materials are to be supplied, by proper location of the operating screws in the removable key channel members.

*Automatic sequencing control* erations of the selected ingredients is provided by means of a multi-position stepping switch 45, a stepping switch coil auxiliary control relay 46 and a plurality of telephone-type stepping switch auxiliary relays 45A–1 to 45A-10 inclusive, one for each point of the stepping switch. Two additional telephone type relays 45A20 and 45A-20X are provided for stepping the movable contact arm of the stepping switch from the point 10 position to the zero or "home" position. The stepping switch 45 may be of any suitable type. Preferably it is a commonly used rotary type selector switch having a plurality of stationary contacts 45a to 45k, a rotary movable contact, a cocking electromagnet 45m and a spring actuated pawl 45n for advancing the rotary contact one step each time the cocking magnet is deenergized by its associated stepping relay 46.

Alternating control voltage of a suitable magnitude (e.g. 110 volts) is supplied from a suitable source such as the alternating voltage supply terminals 47 and 48. Scales 15 and 16 are provided with zero load switches 49 and 50 respectively. Preferably, these switches are of the type known to the art as micro switches. They have the useful property of being able either to open or close their contacts in response to an extremely minute force. The contacts of these switches 49 and 50 are connected in the coil circuits of zero load auxiliary relays 49AX and 50AX respectively of which the normally closed contacts 49AX–a and 50AX–a are in turn connected in series relationship in circuit with the operating coil of the automatic contactor 40 across the supply terminals 47 and 48 as shown in Fig. 6a. The switches 49 and 50 may be assumed to be of the type which closes its contacts in response to a small force. They are so positioned with respect to the scale pointer that when the scale pointer is in its zero position the micro switch contacts are closed as illustrated in Fig. 3. Thus, contacts 49AX–a and 50AX–a of the zero load relays are open if there is any load on the associated scale. Consequently automatic operation can be effected only if there is zero load on the scales and a key selector 43b is in place in the key selector panel to close contacts 38K–10.

Starting control

For the purpose of selecting automatic operation instead of manual operation, a maintaining contact-type rotary switch 51 is connected in series relationship with the operating coil of automatic contactor 40. Preferably this switch is of the type which has two stationary contacts and a rotary contact which is provided with a knob for manual operation. One of the stationary contacts is not connected in any circuit but merely acts as a stop for the rotary contact. Thus the rotary contact remains in either the circuit open or circuit closed position to which it was last actuated. For the purpose of initiating the automatic operation including the repeat cycle operation, a "start" pushbutton type switch 52 and a relay 53 known as the automatic sequencing relay are provided. The operating coil of the relay 53 and the contacts of the start switch are connected in series relationship through the normally closed contacts of a stop switch 54 to the automatic bus 41. In order that a weighing cycle shall not be initiated unless the system is in readiness, a relay 55 known as the "weighing-ready" or repeat cycle relay is provided. A weighing cycle should not be initiated unless the stepping relays for all scales in the system are in their home positions, there is zero load on each scale and the weigh gates for each weigh hopper are closed. To prevent the operation of the repeat cycle relay 55 until these conditions have been fulfilled, its operating coil is connected to the automatic supply bus 41 through the contacts 56a and 57a of the home position relays 56 and 57 operatively associated with the stepping switches for scales 15 and 16, zero load relay contacts 49AX-b and 50AX-b and limit switch contacts 58a and 59a of limit switches 58 and 59 which are associated with the dump gates of the weigh hoppers 3 and 4. In this connection, the contacts of the home relays are closed only when their associated stepping switches are in their zero or home positions.

Reset relay

A reset relay 60 is provided for restoring the stepping switches to their home positions following an automatic dumping operation thereby to leave the system in a reset condition for starting the next repeat cycle. In the event of the stepping switches not being in their home positions during start up from a shut down condition, they must be returned thereto before the system can be operated. For this purpose a manually operated reset switch 61 is included in the energizing circuit of the reset relay.

Conditions precedent to operation

With the foregoing understanding of the elements and their organization, the operation of the system will readily be understood from the following detailed description.

A bin key selector 43b having screw actuators mounted in a pattern for selection of the bins of silo 2 containing ingredients which are to go into the next batch to be made up is inserted in the key selector panel 39. Likewise there is mounted on the glass of the scale door the corresponding paired program card 17 which is designed for the accurate measurement of the exact desired weight of each of such ingredient materials. Insertion of the bin key selector in the selector panel results in closing contacts 38K–10 in the coil circuit of the automatic contactor 40 and also in the closing of the contacts 38K–1B to 38K–9B and in the opening of the bypass contacts 38K–1BP to 38K–9BP of the switches which correspond to the selected bins. For the purposes of illustration assume that bins a and c–i inclusive are to furnish ingredients to the current batch. Consequently the contacts 38K–1B and 38K–3B to 38K–9B inclusive will be closed and contacts 38K–2B will be opened. Conversely the bypass contacts 38K–1BP and 38K–3BP to 38K–9BP will be opened and bypass contacts 38K–2BP will be closed.

Assuming also that automatic operation is desired, the automatic selector switch 51 is turned to its closed position. If there is zero load on the scales, the energizing circuit for the automatic contactor 40 is completed and the contactor picks up and closes its contacts 40a to seal itself in around zero load switch contacts 49AX–a and 50AX–a and it also closes its contacts 40b to energize the automatic bus 41. In response, the automatic auxiliary relay 62 picks up and closes its normally open contacts 62a in the energizing circuit of the "slow" auxiliary relay 34AX. However, the relay 34AX does not pick up because its energizing circuit is still open at the normally open contact 34a of the slowdown relay 34. Energization of the automatic bus 41 results in energization of the coil of the cocking magnet 45m of the stepping switch 45 which is supplied from a rectifier 63 which in turn is supplied from the secondary winding of a transformer 64 of which the primary winding 64a is connected across the automatic bus 41 and the supply terminal 48. As a result of its energization the stepping switch is cocked, i.e. its movable actuating pawl 45n is retracted from engagement with the tooth of the ratchet 45p against the tension of the actuating spring.

Operation

To start the automatic weighing cycle, the start pushbutton switch 52 is depressed to close its contacts to complete an energizing circuit for the operating coil of automatic sequencing relay 53. In response, relay 53 picks up and closes its contacts 53a to seal itself in around the contacts of the start switch which now may be released without interrupting the sequencing. At the same time it closes its contacts 53b. If the stepping switches 45 are in their home positions and if there is zero load on both scales and if the dump gates of the weight hoppers are closed, the home relay contacts 56a and 57a, the zero load relay contacts 49AX–b and 50AX–b and the gate limit switches 58a and 59a will all be closed and the energizing circuit for the weighing-ready relay 55 will be completed. In response to energization, relay 55 picks up and closes its normally open contacts 55a to seal itself in around the home relay contacts and the zero load relay contacts and also closes its normally open contacts 55b to energize the repeat cycle bus 65 by connecting it to the energized automatic bus 41. From this point on in the automatic cycle the stepping of a stepping switch or existence of load on one of the scales cannot drop out the relay 55 and thereby interrupt the automatic cycle.

Operation of feeder

Since the stepping switch 45 is in the home position, the completed sequence relay 66 is deenergized and its normally closed contacts 66b are closed. If there is zero load on scales 15 and 16 and on all other scales, if any, as assumed, the stepping control relay 46 is energized from the repeat cycle bus 65. In response, the relay 46 picks up and opens its contacts 46a to deenergize the stepping switch magnet 45m and permit the cocked spring to step the rotary switch contact to the first position in which it engages stationary contact 45a to complete an energizing circuit for stepping switch auxiliary relay 45A–1. This relay picks up and closes its normally open contacts to complete an energizing circuit for the feeder contactor 38A–1 which in turn picks up and closes its normally open contacts 38A–1a and 38A–1b to connect the driving solenoid of the feeder 6 for bin a to the fast bus 36 (which is energized) and to the slow bus 37 (which is deenergized). As a result, the feeder 6 operates at high speed to supply ingredient material from the bin a to the weigh hopper 4. Simultaneously, the auxiliary relay 38AX–1 is energized and closes its normally open contacts 38AX–1a to complete a sealing in circuit for the stepping relay 46 in parallel with the zero load contacts 50AX–c. This prevents the stepping relay 46 from being deenergized and dropped out by the opening of the zero load contacts in response to application of load to the scale.

Slow down and stopping of feeder

As load in the weight hopper increases, the scale pointer approaches the first slowdown signal hole 23 in the program card 17 and when it passes beneath the hole, light from the light source is transmitted through the hole to the light-conducting rod 31 and through the rod to the photoelectric cell 28a. In response to the slowdown signal relay 34 is energized and closes its contacts 34a to complete an energizing circuit for the slowdown auxiliary relay 34AX which opens its normally closed contacts 34AX–a to deenergize the fast bus and closes its normally open contacts 34AX–b to energize the slow bus 37. This results in reducing the speed of the feeder from a relatively high value to a relatively low value. The feeder continues to operate at this reduced speed until the end of the light-conducting rod 32 arrives beneath the first stop signal hole 24 in the card in which position it receives light from the source and conducts it to the photoelectric cell 28b. In response, the photoelectric cell 28b becomes conducting and energizes the stop relay 35 which picks up and closes its normally open contacts 35a to complete energizing circuits for the operating coil of the stop auxiliary relay 35AX, and for the timing relay 67 which is connected in parallel therewith. Also it simultaneously closes its normally open contacts 35b and opens its normally closed contacts 35c.

In picking up in response to its energization, the stop auxiliary relay 35AX closes its normally open contacts 35AX–a to seal itself in around the contacts 35a of the stop relay and opens its normally closed contacts 35AX–b to deenergize and drop out both the feeder contactor 38A–1 and the feeder auxiliary relay 38AX–1 for the feeder 6. Contactor 38A–1 in dropping out stops the feeder by disconnecting it from bothe the high and low speed buses 36 and 37. The auxiliary relay 38AX–1 in dropping out opens its normally open contacts to deenergize and drop out the stepping relay 46 which closes its normally closed contacts 46a to energize and re-cock the stepping switch. Owing to its having sealed itself in, the stop auxiliary relay 35AX will remain picked up even if the stop relay contacts 35a should open. In this connection, if any additional extra weight of material should fall on the scale the stop signal relay would become deenergized and drop out. This in turn would drop out the stop auxiliary relay if it were not sealed in, and in dropping out it would reclose its contacts 35AX–b and restart the feeder 6 at high speed. This of course could not be tolerated.

As indicated in the timing chart in Fig. 9, in response to energizaton, the timer 67 immediately closes its contacts 67a and maintains them closed for a predetermined interval of time which is represented graphically by the length of the top line in the diagram. During this interval, timer contacts 67b are closed for a shorter interval of time and are reopened before contacts 67a are reopened. Contacts 67b in closing complete an energizing circuit for the "ready" relay 68 which picks up and seals itself in through contacts 68b in parallel with contacts 67b. It also opens its normally closed contacts 68a through which the energizing circuit of the stop auxiliary relay was established and closes its normally open contacts 68c. Contacts 68c in closing energize the stepping relay 46 which picks up and opens its normally closed contacts 46a to deenergize the stepping switch magnet thereby to permit its spring-actuated pawl to step the rotary contact from position 1 to position 2. Since contacts 67a close ahead of contacts 67b and open after them they prevent the ready relay 68 from deenergizing the stop auxiliary relay 35AX and restarting the feeder 6. Prior to the opening of timer contact 67a the stepping switch 45 has moved its rotary contact away from position 1 thereby to deenergize the stepping switch auxiliary relay 45A–1 and open its normally open contacts in the energizing circuit of the feeder contactor 38A–1 and auxiliary relay 38AX–1. This of course prevents the feeder 6 from being restarted during the remainder of the feeding and weighing cycle of the current batch.

Contacts 68a of the ready relay having opened, the re-opening the contacts 67a at the end of the predetermined time interval deenergizes the stop auxiliary relay 35AX which thereupon drops out to open its normally open contacts 35AX–a and close its normally open contacts 35AX–b. The latter contacts in closing reestablish the continuity of the automatic bus 41 thereby to enable the feeder for bin b or any subsequent bin to be started.

Bypassing operation

Responsively to the stepping of the stepping switch 45 to the second position, the stepping switch auxiliary relay 45A–2 picks up and closes its normally open contacts 45A–2a in the energizing circuit of the bin 2 feeder contactor 38A–2 and auxiliary relay 38AX–2. However since the bin key selector for the batch does not have an actuator for bin 2 feeder contacts 38K–2B, they are open and bypass contacts 38K–2BP are closed. Consequently the contactor 38A–2 and relay 38AX–2 do not respond to the operation of stepping switch auxiliary relay 45A–2. The bypass contacts 38K–2BP being closed, the bypass relay 69 is energized and opens its normally closed contacts 69a to deenergize the stepping relay 46 which thereupon closes its normally closed contacts 46a to cock the stepping switch. In response to energization, the stepping switch opens its normally closed contacts 45m1 to deenergize and drop out the bypass relay 69. In dropping out relay 69 recloses its contacts 69a to pick up the stepping relay 46 which opens its contacts 46a to deenergize the stepping switch magnet to permit the actuating pawl to step the rotary contact from position 2 to position 3. In moving from position 2 the auxiliary relay 45A-2 is deenergized and dropped out and its normally open contact 45A-2a interrupts the energizing circuit of the bypass relay 69. In position 3 an energizing circuit is completed for auxiliary relay 45A-3.

In response to energization relay 45A-3 picks up and closes its contacts 45A-3a and since the contacts 38K-3b are closed by the bin key selector the contactor 38A-3 and its corresponding auxiliary relay 38AX-3 for bin c feeder 8 are energized and closed. Thereupon, a predetermined amount of material as determined by the location of the next slowdown and stop signal holes in the program card is automatically fed from bin c to the weigh hopper 4 in the same manner as described with respect to bins a. The operation proceeds from bin to bin, in order, feeding to the weigh hopper from the bins containing materials preselected to make up the desired batch and bypassing those bins containing ingredients not wanted in the batch.

Dumping of weigh hoppers

Upon arrival of the stepping switch rotary contact at position 10, auxiliary relay 45A-10 is energized and in response, it picks up and closes its normally open contacts 45A-10a to complete an energizing circuit for the completed sequence relay 66 which picks up and closes its contacts 66a. Similarly, upon completion of the feeding and weighing cycle for scale 15 (silo 1) its completed sequence relay 70 is energized and its contacts 70a closed. When the completed sequence relays for all other scales (if there are others) are energized and their contacts closed, and if the timer 71 is in its zero time position an energizing circuit is completed for the operating coil of an auxiliary relay 72 through the normally closed contacts 71a of the timer. The relay 72, herein called the dump auxiliary relay, picks and seals itself in through contacts 72a around the timer interlock contacts 71a and the completed sequence interlocks 66a and 70a and also closes its contacts 72b to complete an energizing circuit for the dump signal relay 74. In response, relay 74 picks up and closes its normally open contacts 74a, 74b and 74c. Contacts 74a in closing start the timer 71 and contacts 74b complete energizing circuits for the operating solenoids 75 and 76 for weigh hoppers 3 and 4 to open their weigh gates and dump their contents on the conveyor 5. The timer in starting closes its contacts 71b to seal itself in around contacts 74a. In the open position of the weigh gates, limits switches 58 and 59 for the gates for weigh hoppers 3 and 4 open to deenergize and drop out the repeat cycle relay 55.

Resetting operation

Contacts 74c, in closing, complete an energizing circuit for the reset relay 60 which closes its contacts 60a to pick up its auxiliary relay 60AR which in turn closes its contacts 60ARa and 60ARb. Contacts 60ARa complete an energizing circuit for the bypass relay 69 while contacts 60ARb partially complete a circuit in parallel with contacts 45m1 of the stepping switch. In response, the bypass relay 69 opens its contacts 69a to deenergize the stepping relay 46 which in turn closes its contact 46a to cock the stepping switch 45. In its cocked position, the stepping switch opens its contacts 45m1 to deenergize the bypass relay which drops out to reenergize the stepping relay 46 which in turn deenergizes the stepping switch to permit its actuating spring to step the rotary contact to the next position. The deenergization of the stepping switch again closes contacts 45b to reenergize the bypass relay 69 which again cocks the stepping switch. This stepping operation is repeated until the rotary contact of the stepping switch reaches the zero or home position in which it completes an energizing circuit for the home position relay 45A-20 and its corresponding auxiliary relay 45A-20X. The auxiliary relay 45A-20X picks up and closes its contacts 45A-20X2a to complete the partially completed circuit around the stepping switch contacts 45m1. This prevents deenergization of the bypass relay in response to the cocking of the stepping switch and thus the stepping operation is halted with its rotary contacts in the zero or home position. Relay 45A-20 in picking up closes its contacts 45A-20a to energize the home relay 57 which picks up and closes its contacts 57a partially to complete an energizing circuit for the repeat cycle relay 55. Similarly, the home relay 56 will be picked up when the weigh hopper 3 dumps its load on the conveyor. The removal of load from the weigh hoppers causes the zero load switches 49 and 50 to reclose their contacts to pick up the zero load relays 49AX and 50AX which in turn close their contacts in the energizing circuits of the automatic relay 40 and the repeat cycle relay 55.

The conveyor 5 may feed into a skip hoist (not shown) which, when it moves from its "down" position, opens limit switch 77 to deenergize the dump auxiliary relay 72. In turn the relay 72 drops out to deenergize and drop out the dump signal relay 74. In dropping out relay 74 opens its contacts 74a in the circuit of timer 71, but the timer continues energized and in operation through its own sealing in contacts 71b until it times out and opens them. Relay 74 also opens its contacts 74b and closes its contacts 74d to deenergize the gate opening solenoids 75 and 76 of the weigh hoppers and to energize the closing solenoids 78 and 79 which reclose the gates of hoppers 3 and 4. As a result, gate limit switches reclose their contacts 58a and 59a to complete the energizing circuit for the repeat cycle relay which picks up to initiate a new cycle of feeding and weighing.

Although in accordance with the provisions of the patent statutes, this invention has been described as embodied in concrete form and its principle has been explained together with the best manner in which it is now contemplated carrying that principle into effect, it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. For use with a weigh scale and a plurality of feeders for supplying different materials thereto, a stepping switching device having a plurality of successive operating positions each corresponding to a different one of said feeders and having a movable member operable to said positions in succession to initiate operation of said feeders in succession, weight indication sensing means responsive to each of a plurality of indications each representative of a predetermined weight on the scale for a correspoinding operating position of said movable member for terminating the operation of the active one of said feeders and initiating movement of said movable member to the next successive operating position to effect operation of a different one of said feeders and means responsive to addition of weight to the scale in excess of the amount predetermined for the termination of operation of said active feeder prior to initiation of operation of said different feeder for discontinuing further movement of said movable member to said successive operating positions.

2. For use with a weigh scale and a plurality of feeders for supplying different materials thereto, a stepping switching device having a plurality of successive operating positions each corresponding to a different one of said feeders and having a movable member operable to positions in succession to initiate operation of said feeders in succession, weight indication sensing means responsive to each of a plurality of indications each representative of a predetermined weight on the scale for a corresponding operating position of said movable member for terminating the operation of the active one of said feeders and initiating movement of said movable member to the next successive operating position to effect operation of a different one of said feeders and means responsive to the addition of weight to the scale in excess of the amount predetermined for the termination of operation of said active feeder prior to initiation of operation of said different feeders for discontinuing further movement of said movable member to said successive operation positions, said last mentioned means comprising a timing device, a first electroresponsive device controlled by said sensing means in response to each of said indications for initiating operation of said timing device and a second electro-responsive device jointly controlled by said timing device and said first electroresponsive device for effecting movement of said movable member to the next operating position a predetermined interval of time after initiation of operation of said timing device.

3. For use with a weigh scale and a plurality of feeders for supplying different materials thereto, a switching device having a plurality of successive operating positions each corresponding to a different one of said feeders and having a movable member, means for moving said member to said operating positions in succession to initiate operation of said feeders in succession comprising an electromagnetically actuated stepping mechanism and an electroresponsive device for controlling the actuation of said stepping mechanism, means for terminating the operation of the active one of said feeders comprising a stop relay, a weight indication sensing device for actuating said stop relay in response to each of a plurality of indications each representative of a different predetermined weight on the scale and an auxiliary relay energized in response to actuation of said stop relay for deenergizing said active feeder, a sealing in circuit for said auxiliary relay established in response to its energization and a time element device set in operation in response to actuation of said stop relay for interrupting said sealing in circuit a predetermined interval of time after its establishment.

4. For use with a weigh scale and a plurality of feeders for supplying different materials thereto, a switching device having a plurality of successive operating positions each corresponding to a different one of said feeders and having a movable member, means for moving said member to said operating positions in succession to initiate operation of said feeders in succession comprising an electromagnetically actuated stepping mechanism, means for terminating the operation of the active one of said feeders and initiating operation of the next one of said feeders in succession comprising a stop relay, weight indication sensing means for actuating said stop relay in response to each of a plurality of indications of different predetermined weights on the scale and an auxiliary stop relay energized in response to actuation of said stop relay for deenergizing said active feeder, a sealing in circuit for said auxiliary relay established in response to its energization, a second auxiliary relay, a time element device set in timing operation in response to actuation of said stop relay and cooperating therewith to actuate said second auxiliary relay to cause said stepping mechanism to step said movable member to the next operating position, said time element device also being effective to interrupt said sealing in circuit to cause said auxiliary stop relay to cooperate with said movable member to energize the feeder corresponding to said next operating position thereby to reset said stop relay and said auxiliary stop relay in response to the resulting change in weight indication.

5. A batch weight control system for use with a weight measuring scale and a plurality of feeders for supplying materials thereto comprising removably mounted on the scale a replaceable batch weight program card provided with a plurality of indicia, one for each of the feeders preselected to furnish material to the batch, disposed to cooperate with the weight measuring element of the scale to provide an indication of a predetermined amount of material received on the scale from the corresponding feeder, a stepping switch device having a plurality of successive operating positions each corresponding to a different one of said feeders and having a movable member operable to said operating positions in succession to initiate operation of said feeders in succession, selector switching means for preselecting predetermined feeders to furnish materials to a batch comprising a support mounting a plurality of individual switching devices each controlling a different one of said feeders, a replaceable key selector paired with said program card and detachably mounted to said support and mounting an array of individual actuators for actuating the switching devices controlling the feeders preselected to furnish materials to the batch, and weight indication sensing means responsive to each of a plurality of different weight indications for terminating operation of the active one of said feeders and effecting stepping operation of said movable member to the next operating position in succession to cooperate with a preselected one of said switching devices to initiate operation of a different feeder.

6. A batch weight control system for use with a weight measuring scale and a plurality of feeders for supplying materials thereto comprising removably mounted on the scale a replaceable batch weight program card provided with a plurality of indicia, one for each of the feeders preselected to furnish material to the batch, disposed to cooperate with the weight measuring element of the scale to provide an indication of a predetermined amount of material received on the scale from the corresponding feeder, a stepping switch device having a plurality of successive operating positions each corresponding to a different one of said feeders and having a movable member operable to said operating positions in succession to initiate operation of said feeders in succession, a selector switching means for preselecting predetermined feeders to furnish materials to a batch comprising a support mounting a plurality of individual switching devices each controlling a different one of said feeders, a replaceable key selector paired with said program card and detachably mounted to said support and mounting an array of individual actuators for actuating the switching devices controlling the feeders preselected to furnish materials to the batch, weight indication sensing means responsive to each of a plurality of different weight indications for terminating operation of the active one of said feeders and effecting stepping operation of said movable member to the next operating position in succession to cooperate with a preselected one of said switching devices to initiate operation of a different feeder, and bypassing switching means responsive to operation of said movable member to a position corresponding to an unselected feeder for causing said movable member to move to the next in succession of said operating positions.

References Cited in the file of this patent

UNITED STATES PATENTS

| | | |
|---|---|---|
| 1,306,202 | Thompson et al. | June 10, 1919 |
| 1,618,757 | Hoxie | Feb. 22, 1927 |
| 1,684,394 | Haase | Sept. 18, 1928 |
| 2,041,589 | Bowers | May 19, 1936 |
| 2,066,012 | McCrery | Dec. 29, 1936 |
| 2,208,284 | Weckerly | July 16, 1940 |
| 2,336,130 | Saxe | Dec. 7, 1943 |
| 2,524,338 | Ylinen | Oct. 3, 1950 |
| 2,558,522 | Knapp | June 26, 1951 |
| 2,625,300 | Saxe | Jan. 13, 1953 |
| 2,625,301 | Saxe | Jan. 13, 1953 |
| 2,650,790 | Carliss | Sept. 1, 1953 |
| 2,656,109 | Lindars | Oct. 20, 1953 |

(Other references on following page)

| | UNITED STATES PATENTS | | | | |
|---|---|---|---|---|---|
| 2,659,563 | Saxe | Nov. 17, 1953 | 2,787,402 | Stiner et al. | Apr. 2, 1957 |
| 2,660,351 | Thompson | Nov. 24, 1953 | 2,793,000 | Klein et al. | May 21, 1957 |
| 2,664,260 | Saxe | Dec. 29, 1953 | 2,801,819 | Lindars | Aug. 6, 1957 |
| 2,743,896 | Nauta | May 1, 1956 | 2,825,773 | Avdeenko | Mar. 4, 1958 |
| 2,769,043 | Ulinski | Oct. 30, 1956 | 2,834,851 | Mastney et al. | May 13, 1958 |
| | | | 2,848,019 | Corbin et al. | Aug. 19, 1958 |